United States Patent [19]

Entrup

[11] 4,164,358
[45] Aug. 14, 1979

[54] DUAL WHEEL CONVERSION ASSEMBLY FOR VEHICLES

[75] Inventor: Robert N. Entrup, Wheatridge, Colo.

[73] Assignee: Design Automotive Distributing, Denver, Colo.

[21] Appl. No.: 849,964

[22] Filed: Nov. 9, 1977

Related U.S. Application Data

[63] Continuation of Ser. No. 617,284, Sep. 20, 1975, abandoned.

[51] Int. Cl.² .......................................... B60B 11/00
[52] U.S. Cl. ............................... 301/36 R; 301/63 R
[58] Field of Search ............... 301/13 SM, 36 R, 36 A, 301/36 WP, 38 R, 39 R, 40 R, 40 S, 638; 280/152 R, 153 R

[56] References Cited

U.S. PATENT DOCUMENTS

| | | | |
|---|---|---|---|
| 2,625,438 | 1/1953 | Horn | 301/36 R |
| 2,844,388 | 7/1958 | Rheeling | 280/152 R |
| 3,139,309 | 6/1964 | Breton | 301/36 WP |
| 3,495,672 | 2/1970 | Barr | 301/36 R |

Primary Examiner—Robert J. Spar
Assistant Examiner—H. Grant Skaggs
Attorney, Agent, or Firm—John E. Reilly; James R. Young

[57] ABSTRACT

A pair of specially configured tire mounting rims are adapted for attachment to the axle hub of an existing vehicle for converting from single to dual wheel mount configurations. The wheel mounts include one dish arrangement which incorporates a substantially flat radial web plate including appropriately spaced holes for attachment to axle bolt positions so that the rim channel generally overlies the axle terminating assembly. The other wheel mount has an interior web which extends in a convex or conical relation with matching bolt holes for placement over the axle bolts. The convex or conical web plate of the second wheel mount is arranged with sufficient extension so as to retain the tires on both mounts in separated relation while providing dual wheel support for the vehicle.

3 Claims, 6 Drawing Figures

U.S. Patent  Aug. 14, 1979  Sheet 1 of 2  4,164,358
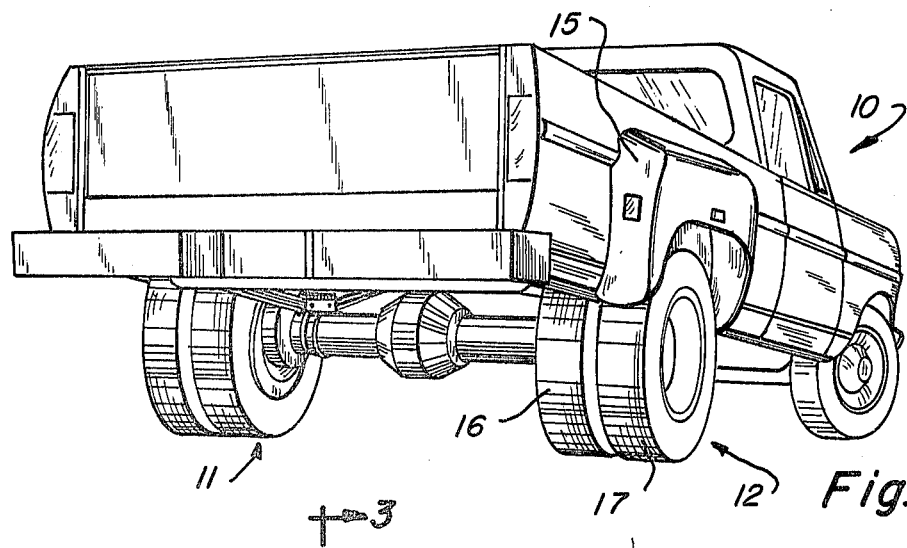
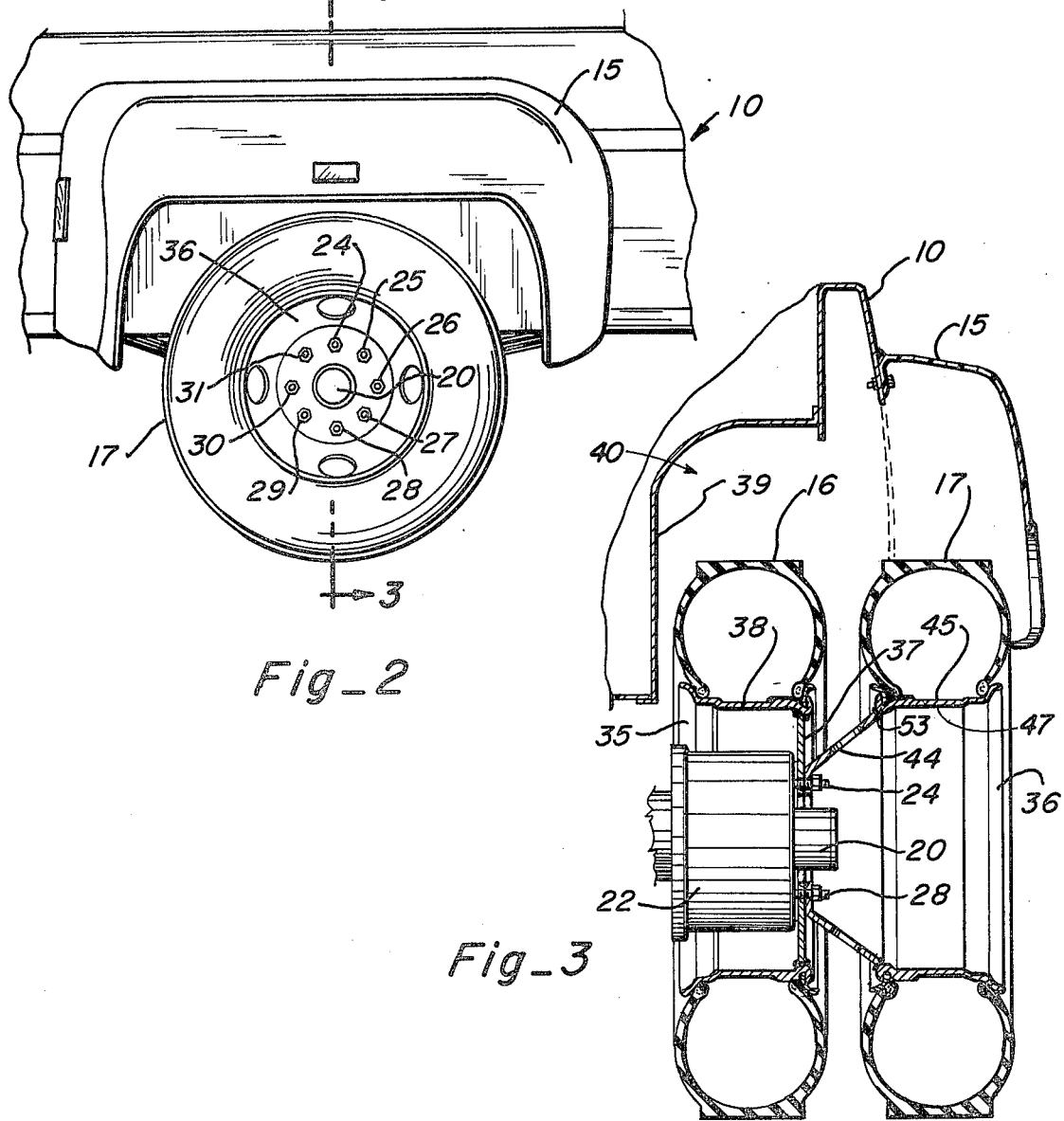

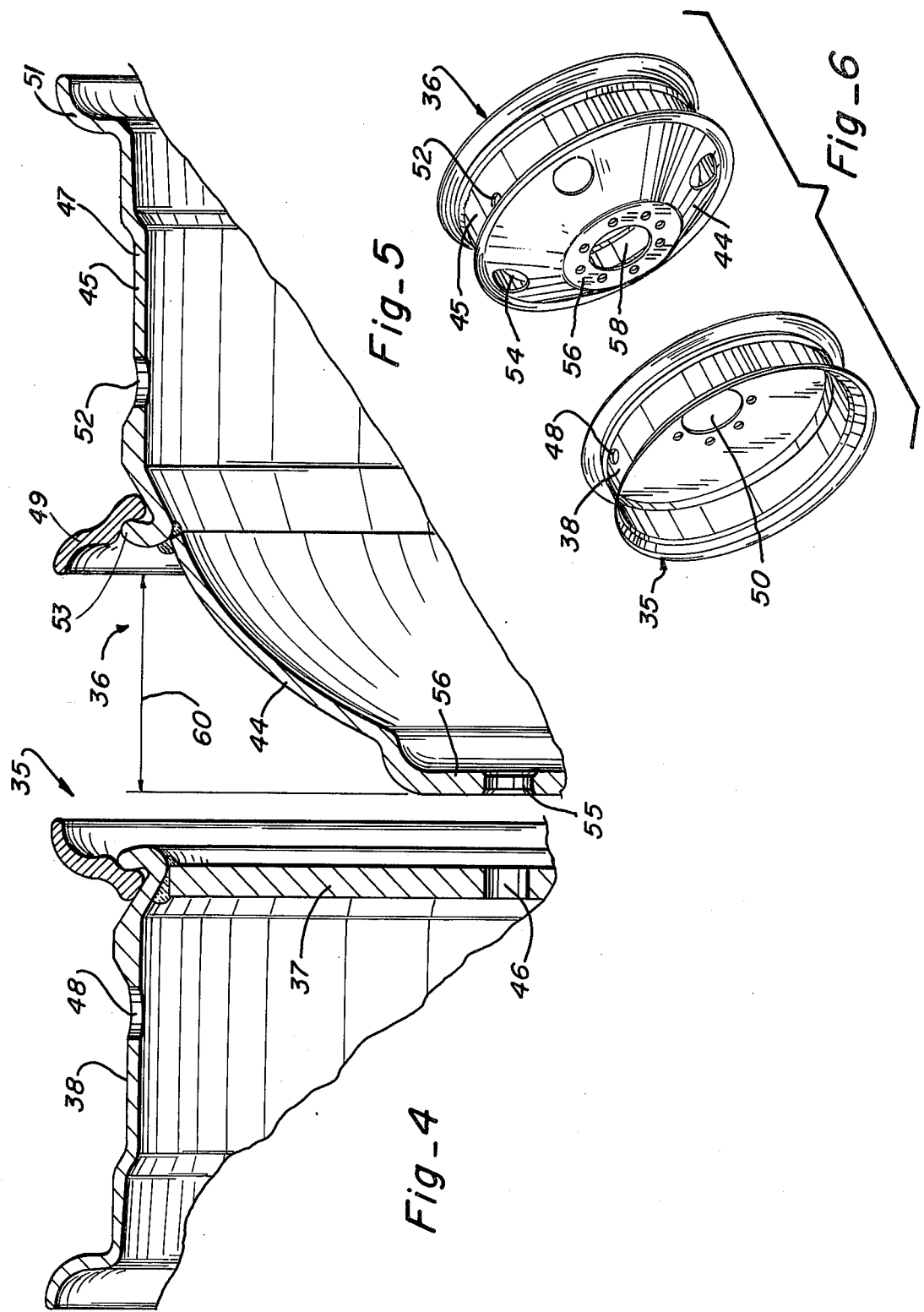

DUAL WHEEL CONVERSION ASSEMBLY FOR VEHICLES

This application is a continuation application of Ser. No. 617,284, filed 20 Sept. 1975 for DUAL WHEEL CONVERSION ASSEMBY FOR VEHICLES now abandoned.

BACKGROUND OF THE INVENTION

The present invention relates to apparatus for converting a single wheel mount of a vehicle to a dual wheel mount configuration. The present invention is particularly useful for converting wheel mounts of vehicles which normally have a single wheel attached thereto into dual wheel configurations. It is anticipated that the present invention will be particularly useful for pickup trucks, vans, motor homes, campers, transports, stock haulers, fifth-wheel trailers, tow trucks, tractors and the like.

The vast majority of the contemporary motor vehicles are manufactured so that the axles have wheel mounts to which can be attached single tire mounting rims. For many applications, such wheel mounting arrangements are generally satisfactory. However, there are many occasions when dual wheel mounting at the ends of each axle is highly desirable, especially with respect to the rear or powered axles. For instance, although pickup trucks, vans, passenger vehicles and the like are structurally designed to accommodate certain maximum loads, heavy usage of such vehicles at about their maximum load design places excessive stress upon the vehicle tires. There are also many ocassions when vehicle traction requires augmentation which can be effected most conveniently through additional tire engagement with the surfaces over which the vehicle must travel. One prior art solution is to resort to wider, heavier constructed tires but this solution is not always most desirable especially since it still requires acceptance of the single wheel mount in contrast to the safety factor associated with utilizing dual wheel mounts. That is, a blow-out or deflation of one tire on a dual mount is generally not sufficient to incapacitate the vehicle but is a hazard for any single wheel mount.

Accordingly there has been considerable attention directed toward providing additional wheel mounting for normally single wheel mounting vehicles. It has been suggested that an additional wheel can be attached to the existing axle by incorporating a spacer adapter which can be attached at one end to the axle hub through the existing mounting stud bolts and which has mounting accommodations for the additional wheel at the other end thereof. One example is the double flanged cylindrical adaptor shown by Clark U.S. Pat. No. 3,039,825 with Donnell U.S. Pat. No. 3,837,708 showing yet another version particularly adapted to tractor axles. The use of extended mounting stud bolts along with a spacer type of torsion bar plate is shown in Barr'e U.S. Pat. No. 3,664,709. Barr'e also suggests including extension skirts for the existing fender system so as to ensure coverage of the added dual wheel.

It has likewise been suggested that identical wheel mounting rims be employed so that they can be attached to the common mounting studs on the axle of the vehicle in a back-to-back relation as in U.S. Pat. No. 2,844,409 by Eksergian and also in U.S. Pat. No. 2,545,130 by Ash. However, mounting configurations as suggested by Eksergian and Ash are not well suited for many vehicular applications since the wheel well spacing between the interior surface thereof and the axle mounting hub is insufficient to accommodate such extended mounting hubs as taught by these patents. Thus the vehicle must be originally constructed with exceptional wheel well clearance or the entire wheel mounting associated with the axle hub must be somehow extended. It should also be noted that modifications to inside fender wells to allow for standard dual wheels is not practical for individuals who mount campers in the boxes of pick-up trucks. The width (approximately 40") of the camper will not allow the inside fender wells to be moved inward.

Therefore there has been a continuing need for apparatus which can permit conversion of existing motor vehicles from single to dual wheel configurations without requiring substantial modification to the vehicle structure and further without requiring special design of the existing axle hub and its wheel mounting apparatus.

SUMMARY OF THE INVENTION

The present invention provides a means for converting a motor vehicle from a single wheel mounting configuration to a dual wheel mounting configuration without requiring any modification to the major structure of the vehicle and in accommodation to existing axle hub mounting devices. A pair of tire mounting rims are arranged so as to cooperate for providing the dual mounting configuration in compatible relation with the existing axle hub mounting studs. The apparatus is fully compatible with the existing axle hub and wheel well with two relatively minor possible exceptions relating to the length of the stud bolts and to any enclosing fender or other protective superstructure. However, replacement of the stud bolts is easily achieved and the protective superstructure can be modified without undue difficulty to accommodate the dual wheel mounting arrangement.

One of the tire mounting rims is arranged with a band formed as a conventional tire mounting channel. One end of the band is attached to an inwardly extending generally flat radial inner web which has appropriately positioned holes for mounting over the existing axle hub stud bolts or to longer replacement stud bolts in the same positions as the original stud bolts. The channel band and web are configured to define an internal cavity which substantially encloses the axle terminating assembly including the brake housing but still provides clearance between the mounting rim and its tire relative to both the sidewall of the wheel well and the brake housing. The outer mounting rim is likewise composed of a cylindrical band formed as a conventional tire receiving channel but is further arranged in a configuration so as to have a radial support web which is in a conical configuration extending beyond the plane of one side of the mounting rim. The inner portion of the conical web for the outer rim has a flange or shoulder portion with a plurality of axle hub stud bolt matching holes so that the two wheel mounting rims can be placed in proximity over the common studs and attached to the hub. The offset mounting of the conical web permits sufficient clearance between both rims and the tires mounted thereon for preventing any interference therebetween during normal usage. Accordingly the wheel mount can be reconverted to a single tire configuration by using either of the wheel mounting rims alone or by employing a state of the art wheel rim on the axle hub.

An object of this invention is to provide a novel and improved means for attaching a dual wheel mounting assembly to existing motor vehicle axle mounting apparatus.

Another object of this invention is to provide a novel arrangement of wheel mounting rim configurations so as to permit the conversion of a single wheel mount to a dual wheel mount without requiring significant modification to the wheel mounting apparatus or the brake housing.

A further object of this invention is to provide a novel wheel mounting rim configuration which allows replacement of single wheel mounts with a dual wheel mount configuration without requiring modification of the brake housing, axle or drive structure of the vehicle except insertion of longer stud bolts if required.

The foregoing and other objects, features and advantages of the present invention will be more apparent in view of the following detailed description of an exemplary preferred embodiment.

BRIEF DESCRIPTION OF THE DRAWINGS

FIG. 1 is a perspective rear view of a vehicle which has been modified in accordance with the present invention for inclusion of a pair of dual wheel mounts.

FIG. 2 is a side view of the dual wheel mount on the rear portion of the vehicle shown in FIG. 1.

FIG. 3 is a section view of the dual wheel mount arrangement of FIG. 2 taken along line 3—3 thereof.

FIG. 4 is an enlarged cross-sectional view of the inner wheel mount employed in the preferred embodiment.

FIG. 5 is an enlarged section view of a portion of the outer wheel mount.

FIG. 6 is a perspective view showing the interrelationships between the inner and outer wheel mounts.

DETAILED DESCRIPTION OF THE PREFERRED EMBODIMENT

FIG. 1 illustrates a rear perspective view of a vehicle 10 which has been modified in accordance with the present invention so as to include a pair of dual wheel mount assemblies 11 and 12. Vehicle 10 as shown is typically a half ton, three-quarter tone or one ton pick-up truck although the adaptability of the present invention to a wide variety of other vehicles will be readily recognized. The enclosing superstructure for the wheel well in such vehicles when manufactured is frequently insufficient to accommodate dual wheels and thus a fender extension or shroud such as 15 can be attached to the vehicle side by any suitable means if such additional enclosure is required. Such a fender adapter can include running lights, tail lights or the like. However, the fender 15 forms no part of this invention other than as an accommodation for the dual wheel mounting described below.

As seen in FIG. 2 and the section view thereof in FIG. 3, the rear drive axle terminates in hub 20 extending axially from within brake housing 22. As is conventional for many vehicles such as that illustrated, a plurality of stud bolts 24-31 extend from a plate rotatably attached to the drive axle of the vehicle with this plate generally formed as an end cap or brake housing 22. A pair of wheels 35 and 36 are arranged so as to have matching bores therethrough so that each fits over the axle hub 20 and the mounting studs 24-31 for bolting in place using a typical nut having a conical leading edge for properly seating the wheel. Note that conical adapters (not shown) can likewise be included between wheel 35 and 36 if desired. The inner wheel 35 is formed in a somewhat flat-dish configuration with a substantially flat central web 37 attached along one inner circumferential edge of a conventional tire rim retaining channel 38. Thus channel 38 and web 37 form a dishlike cavity configured so that wheel 36 is in surrounding relation to axle hub 20 and brake housing 22. Further, the configuration of wheel 36 advantageously provides adequate clearance between inner wall 39 of the wheel well 40 for normal usage.

The other wheel 36 is arranged with a generally conical extending surface 44 with an interior radial shoulder or flange having holes therethrough for accommodating mounting stud bolts 24-31. The tire retaining rim channel 45 of wheel 36 is held in an extended position by conical web portion 44 so that tire 17 is positioned clear of interference with tire 16 and wheel 35.

The details of wheels 35 and 36 are more clearly evident in the partially fragmented section views of FIGS. 4 and 5 and in the perspective view of FIG. 6. Conventional prior art tire wheels hold the tire retaining rim channel in somewhat offset relation to the mounting plate for the studs 24-31 and thus cannot reasonably accommodate an extension hub for the additional wheel. Accordingly wheel 35 is preferably formed as mentioned above with a substantially flat inner web 37 with a plurality of appropriately spaced stud bolt holes such as 46 (FIG. 4) arrayed therearound and a conventional valve stem port 48 through the rim. Further, wheel 35 has a central aperture 50 therethrough for fitting over axle hub 20. Support web 37 is preferably welded along the inner peripheral wall of channel member 38 in proximity to one end as shown. The tire retaining rim channel 38 as well as rim channel 45 for wheel 36 can be a conventional split rim configuration. Tire retaining channel 45 is formed with a bottom surface portion 47, an inner sidewall portion 49 and an outer sidewall portion 51. Bottom surface portion 47 has an inner edge terminating in a reverse curved flange 53 to which inner sidewall portion 49 is attached in over and under configuration. Conical portion or web 44 is attached to flange 53 adjacent sidewall portion 49 so as to form a continuous extension of bottom surface portion 47.

Wheel 36 is formed with a tire retaining rim channel 45 and a valve stem accommodating port 52. As can be seen in FIG. 6 the outwardly convex curved web 44 can incorporate appropriate cooling vents such as 54 therethrough. Although not shown, not that an access hole can be included in web 37 in alignment with one of the holes in web 44 to permit external access to a valve stem in hole 48. Further, a plurality of bores such as 55 in FIG. 5 are formed on the inner flat shoulder or flange portion 56 of the web for accommodating mounting nuts. As shown, the bores such as 55 can include internal beveled surfaces for accommodating seating of the rim 36. Note that rim 35 can likewise include such beveled conical shoulders as shown for bore 55 if desired and additional conical spacers for seating wheel 35 employed. As with wheel 35, wheel 36 includes an axial bore 58 therethrough for accommodating hub 20 of the vehicle axle.

In a typical application for mounting a pair of 16.0×7.50 tires 16 and 17, the diametric distance between the outer lower surface of the tire mounting rim channels 38 and 45 are both 16.0 inches and the inner lower width of channels 38 and 45 are 4.50 inches with the width between the upper outer edges being 5.813 inches. Wheel 35 has a 4.781 inch central bore 50 while wheel 36 has a 4.50 or 4.75 inch central bore 58. The stud bolt holes such as 46 for wheel 35 and 55 for wheel 36 are placed on a 6.5 inch radius circle relative to the central axis thereof. The offset relation for the outer edge of the tire rim channel 45 and the outer surface of shoulder 56 shown as 60 in FIG. 5 for the aforementioned dimensions is typically 1.313 inches. The tire rim mount and web portions 37 and 44 are typically formed of 0.250 inch steel. Typically the inner surface web 37 for wheel 35 is offset two inches from the center line of tire mounting rim channel 38.

The specific data mentioned hereinabove is particularly applicable to the contemporary Americana Leisure Vehicle produced by the Chevrolet Division of General Motors Corporation. However it will be readily apparent that the wheels can be easily adapted to other manufacturer's vehicles, can accommodate a range of different wheel sizes (e.g.: 15", 16", 16.5", 17", etc.) and can even be employed with the data given for a variety of other vehicles.

Dual wheel mounts in accordance with the present invention, in addition to providing increased safety, also enhance the stability and traction of the receiving vehicle during operation as will be readily recognized. Furthermore, the invention is particularly well suited for accommodating a complete conversion kit which can include the fender and all necessary elements for quickly converting any vehicle. Note that the stud bolts 24-31 can be replaced with longer stud bolts if the existing stud bolts are insufficient in length to accommodate the thickness of both wheels 35 and 36.

Although the present invention has been described with particularity relative to the foregoing exemplary preferred embodiment, various changes, modifications, additions and applications thereof other than those specifically mentioned herein will be readily apparent to those having normal skill in the art without departing from the spirit of this invention.

What is claimed is:

1. In a vehicle which has a wheel well provided with an inner wall and an axle terminating in a mounting hub assembly including a cylindrical brake housing and a plurality of stud bolt attachment means arranged in parallel relation to the axis of the axle with the stud bolt attachment means extending outwardly from the brake housing at the outer end of the assembly wherein said hub assembly is spaced but a limited distance outwardly from the inner wall of the wheel well, apparatus for accommodating dual wheel mounting to the axle within the wheel well comprising in combination:

a first wheel including a first cylindrical rim having an outer end, a first radially outwardly opening circumferential channel for receiving a tire and a first support web in its entirety in the shape of a flat annular plate with a circular perimeter corresponding in diameter with said outer end of said first rim, said annular plate attached at its perimeter directly to the outer end of said first rim in radial alignment thereto, said first support web having a plurality of bores therethrough in radially spaced relation to the central axis of said first wheel for alignably receiving the axle stud bolt attachment means, said first cylindrical rim and said first support web being dimensioned and arranged such that said first rim is positioned to extend inwardly from said first support web in axially co-extensive and concentric radially outward spaced relation to the brake housing and in axially outward spaced relation to the inner wall of the wheel well in which the axle terminating assembly is located, and a second wheel including a second cylindrical rim having a second radially outwardly opening circumferential channel for receiving a tire, said second channel having a bottom surface portion, an outer sidewall portion and an inner sidewall portion, said bottom surface portion having an inner edge formed as a reverse curved flange, said reverse curved flange attached to said inner sidewall portion in over and under configuration, and a second support web attached to and extending axially from said reverse curved flange and converging inwardly from said reverse curved flange toward the central axis of said second wheel to the perimeter of and terminating in a flat, annular flange portion concentric with the axis of said second wheel and laying in a plane perpendicular to said axis of said second wheel in axially spaced, outwardly extending relation to said one end of said second wheel, said annular flange portion having a plurality of bores therethrough in parallel, radially spaced relation to said central axis of said second wheel for alignably receiving the axle stud bolt attachment means, the distance of axial extension of said second support web from said one end of said second wheel to said annular flange portion being sufficient to retain tires positioned on said first and second rim channels, respectively, in axially spaced, non-interfacing orientation with each other when said annular flange portion is disposed in flush contacting relation to said first support web.

2. Apparatus in accordance with claim 1 wherein said second support web is formed with an outwardly convex surface extending axially outwardly from said one end of said second rim and curving radially inwardly to said outer perimeter of said flat, annular flange portion.

3. Apparatus in accordance with claim 1, wherein said second support web is in the shape of a conical frustum, the base of which is attached to and extends from said reverse curved flange as a continuous extension of said bottom surface portion and the opposite end of said second support web converging to the outer perimeter of said flat, annular flange portion.

* * * * *

UNITED STATES PATENT AND TRADEMARK OFFICE
CERTIFICATE OF CORRECTION

PATENT NO. : 4,164,358
DATED : August 14, 1979
INVENTOR(S) : Robert N. Entrup

It is certified that error appears in the above—identified patent and that said Letters Patent is hereby corrected as shown below:

In the Specification:

Column 3, line 43, cancel "tone" and substitute -- ton --.
Column 4, line 6, cancel "36" and substitute -- 35 --.
Column 4, line 8, cancel "36" and substitute -- 35 --.
Column 4, line 49, cancel "not" (second occurrence) and substitute -- note --.
Column 4, line 57, cancel "rim" and substitute -- wheel -- (both occurrences).

Signed and Sealed this

Twenty-fifth Day of August 1981

[SEAL]

Attest:

Attesting Officer

GERALD J. MOSSINGHOFF
Commissioner of Patents and Trademarks